United States Patent [19]

Clancy et al.

[11] 4,286,202

[45] Aug. 25, 1981

[54] ELECTRONIC DAMPING OF STEPPER MOTOR

[75] Inventors: Douglas E. Clancy, Austin; Richard F. Frankeny, Elgin; George P. Olson, Austin, all of Tex.

[73] Assignee: International Business Machines Corp., Armonk, N.Y.

[21] Appl. No.: 57,777

[22] Filed: Jul. 16, 1979

[51] Int. Cl.³ .......................................... G05B 19/40
[52] U.S. Cl. ................................... 318/696; 318/685
[58] Field of Search .............. 318/696, 685, 139, 254, 318/138

[56] References Cited

U.S. PATENT DOCUMENTS

| | | | |
|---|---|---|---|
| 3,399,753 | 9/1968 | Revelle | 197/49 |
| 3,423,658 | 1/1969 | Barrus | 318/138 |
| 3,573,589 | 4/1971 | Berry | 318/685 X |
| 3,586,953 | 6/1971 | Markkanen et al. | 318/685 |
| 3,636,429 | 1/1972 | Jakubowski et al. | 318/696 X |
| 3,663,880 | 5/1972 | Gabor | 318/603 |
| 3,746,959 | 7/1973 | Kobayashi et al. | 318/696 |
| 3,789,971 | 2/1974 | Deyesso et al. | 197/18 |
| 3,954,163 | 5/1976 | Gabor | 197/18 |
| 4,091,316 | 5/1978 | Friedman | 318/696 |
| 4,137,491 | 1/1979 | Bartley et al. | 318/685 |
| 4,164,697 | 8/1979 | Everett | 318/685 X |

FOREIGN PATENT DOCUMENTS 2251945 of 0000 France .

OTHER PUBLICATIONS

"Dynamic Performance of a Three Phase Variable-Reluctance Motor", by J. P. Pawletko and H. D. Chai, published in the Proceedings of the 7th Annual Symposium on Incremental Motion Control System Devices, May 24-26, 1978, pp. 1-6.

Primary Examiner—B. Dobeck
Attorney, Agent, or Firm—John L. Jackson

[57] ABSTRACT

A damping control system for a three phase stepper motor. A reluctance velocity transducer is used for each of the three phases. The output of each of the transducers is proportional to the rotational velocity of the motor. Each of the transducers is rotationally phase shifted 3.75 with respect to one another and phased to the motor rotor rotationally such that the zero voltage crossings of the transducers correspond to the zero torque crossings of the motor. During damping or detenting of the motor the selected phase has current applied to it which is equal to a predetermined fixed value plus the feedback from its associated transducer. The windings on each side of the detent position have current applied to them which is proportional to the voltage from their respective feedback transducers. The voltage in each of the windings is amplified by a selected gain constant. The current in each of the windings is such that maximum torque is applied to drive the motor to the detent position with appropriate current reversals in the windings to damp out any kinetic energy in the rotor during detenting.

13 Claims, 12 Drawing Figures

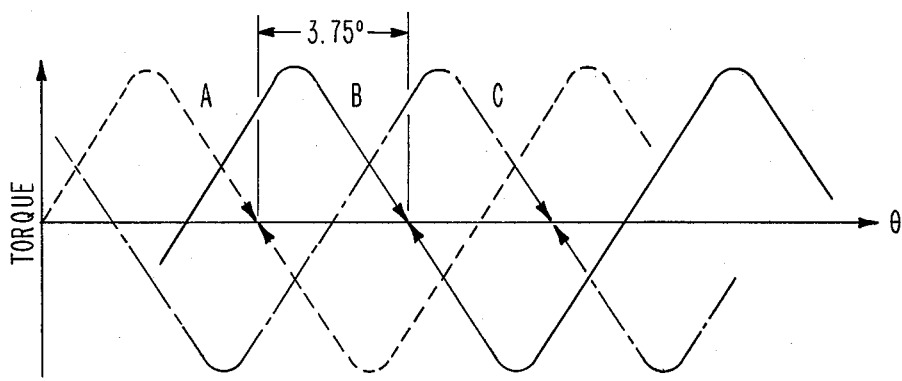
FIG.6   MOTOR TORQUE VS. DISPLACEMENT
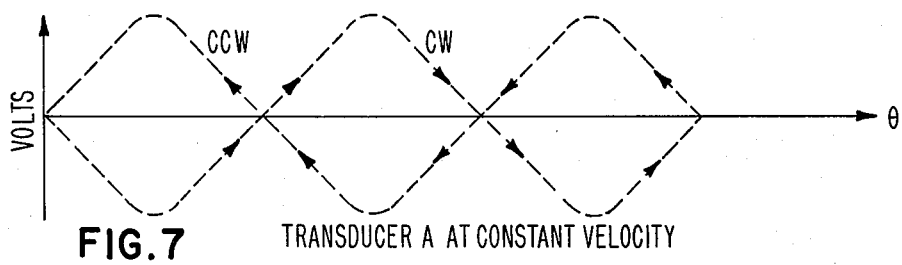
FIG.7   TRANSDUCER A AT CONSTANT VELOCITY
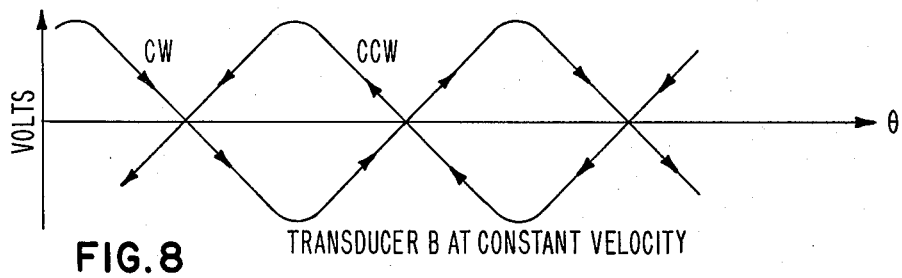
FIG.8   TRANSDUCER B AT CONSTANT VELOCITY
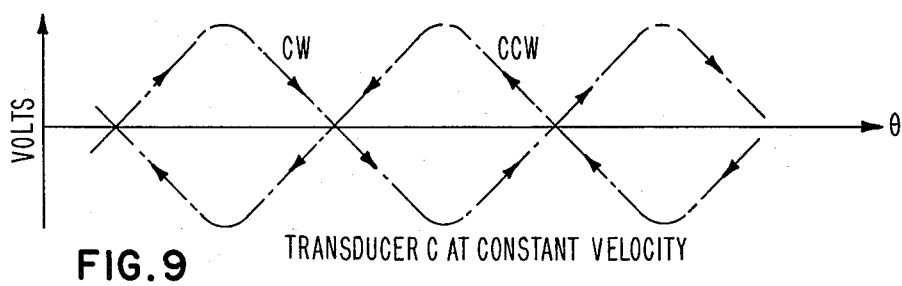
FIG.9   TRANSDUCER C AT CONSTANT VELOCITY

ELECTRONIC DAMPING OF STEPPER MOTOR

DESCRIPTION

BACKGROUND OF THE INVENTION

1. Field of the Invention

This invention relates to the damping or detenting of stepper motors in general and, more particularly, to a detenting technique which achieves a velocity controlled detent without the need of a tachometer by utilization of variable reluctance feedback transducers which are rotationally positioned on the motor such that the velocity feedback of each phase is in phase with the torque output of its respective phase. Control is based on the output of the velocity feedback of the transducers.

2. Description of the Prior Art

Accurate control of stepper motor positioning in many modern day applications is required. Most systems control stepper motors such that accurate control of the velocity profile is maintained through acceleration, steady state travel and deceleration. The motors, following the deceleration period, are detented at the desired location.

In the prior art most systems are devoted to the control of stepper motors over a period of a number of steps to position the motor from an initial location to a desired location. This gross control of the motor is intended to cause the load to be moved as rapidly as possible from a starting position to a desired position. These systems in the prior art, once the stepper motor has arrived at the approximate desired position, rely on the inherent detenting of the stepper motor for final detenting. Alternately, electrochemical detents can be used.

U.S. Pat. No. 3,399,753 entitled "Printer with Type Wheel Rotatable in Either Direction" to Revelie, filed Jan. 10, 1966, issued Sept. 3, 1968 is a patent which is directed toward a technique for moving a print wheel which is driven by a stepper motor in the shortest direction. There is no concern in the patent with the problem of capture or detent oscillation. This problem is occasioned by the fact that at the home or desired position there is zero torque in the motor and due to the kinetic energy in the load, overshoot and consequently oscillation occurs. Instead, the patent is directed toward moving in the quickest possible manner to the desired position.

U.S. Pat. No. 3,663,880 entitled "Apparatus for Controlling the Relative Position Between Two Relatively Movable Members," to Gabor, filed Sept. 14, 1970, issued May 16, 1972 is an example of a prior art stepper motor control system. This system teaches the control of the movement of a load under control of a stepper motor for a large distance. As shown in FIG. 2C of the patent, the velocity is controlled for an acceleration period, a steady state period, a deceleration period, and a homing or detenting period. The overall structure of this system is designed for rapidly moving a load from one point to another. There is no teaching in this system of the problems associated at the home position with motor overshoot.

U.S. Pat. No. 3,789,971 entitled "Servo Control System for a Serial Printer Print Head" to Deyesso, filed June 21, 1971, issued Feb. 5, 1974 is another prior art system which teaches the control of a stepper motor for movement of a load over a large distance. In this system the load is moved in the closest direction at multiple load velocities to cause rapid positioning. Again, there is no concern in this system with detent oscillation or capture at the final position.

U.S. Pat. No. 3,954,163 entitled "High Speed Printer With Intermittent Print Wheel and Carriage Movement" to Gabor, filed Sept. 11, 1974, issued May 4, 1976 is another prior art system which is concerned with the movement of a load over a large distance as rapidly as possible. This system is quite similar to the afore discussed U.S. Pat. No. 3,663,880 in that they employ the same concept for control. Again, there is no concern in this patent with detent oscillation or capture occasioned by the kinetic energy of the load at the zero torque or detent position.

BRIEF DESCRIPTION OF THE PRESENT INVENTION

The damping system of the present invention utilizes three 32 cycle per revolution AC feedbacks with a three phase 96 step motor. The output of the feedbacks are proportional to the angular velocity of the motor. Three reluctance pick-up feedback devices are rotationally phase shifted 3.75° which results in a 120° electrical phase shift with respect to one another and additionally phased to the motor rotor rotationally such that the zero voltage crossings of the transducers correspond to the zero torque crossings of the motor. The feedbacks provide velocity information for each motor phase such that the current in each phase can be controlled when the motor is being detented. In a typical undamped one position move from, for instance, detent position A to a detent position B, prior to the start of the move the current in winding A would be at a fixed DC value and the currents in the other two of the three phase windings B and C would be at zero. As the current in winding A decreases towards zero and the current in winding B increases toward a fixed DC value, the resulting torque unbalance causes the rotor to accelerate to detent position B arriving at the zero torque crossing with some value of kinetic enery. It is this kinetic energy which presents the overshoot damping problem, e.g., kinetic energy verses zero holding torque. The rotor will oscillate about the detent position until the energy is dissipated which typically is several cycles.

In the control system of the present invention all phases of the motor are used to achieve large damping rates as described by the following equations:

$$I_a = A \text{ feedback} * K1$$

$$I_b = DC \text{ value} + B \text{ feedback} * K1$$

$$I_c = C \text{ feedback} * K1$$

where $I_a$, $I_b$, $I_c$ represent current in the respective windings and are constrained to always be of a positive value and K1 represents a gain constant. Phase B is the detented phase.

Therefore, at the beginning of the one step sequence the current in winding B increases, the current in winding A decreases, and rotor begins to move toward detent B as in the undamped case. However, as this occurs, the control system causes the phase currents to be modified by the velocity feedback in the following manner: phase current B will be decreased since the B feedback is in the negative region; phase current A will be increased by A feedback; and phase current C will be increased until sufficient motion occurs to produce negative feedback. As the rotor passes the detent position the B feedback changes polarity causing the current in winding B to be increased beyond the DC value producing maximum deceleration torque for that phase location. The feedback will remain positive until the rotor reaches the maximum overshoot position, then as the rotor reverses direction and moves toward the detent, the polarity of B feedback changes and the current in winding B is reduced. The other feedbacks also change polarity and the conditions are similar to the beginning single step sequence where phases A and C are essentially reversed. For multi-step moves the feedback loops are not used until the rotor is within 1½ steps of the detent position. A requirement for multi-step moves is that the velocity of the rotor (kinetic energy) is within the capture range of the motor when the position mode is entered.

The summation effect of the three phases is that torque can be controlled in relation to velocity. The feedback characteristics are controlled by the gain of the feedback loops (K1). Low values of K1 produce rapid response with a large overshoot and conversely, large values of K1 produce overdamped responses.

BRIEF DESCRIPTION OF THE DRAWING

Referring now to the drawings, wherein a preferred embodiment of the invention is illustrated, and wherein like reference numerals are used throughout to designate like parts:

FIG. 6 is a graph showing motor torque verses displacement of a three phase stepper motor;

FIG. 7 is a graph showing the output of the transducer associated with phase A of a three phase stepper motor when the motor is rotating at constant velocity;

FIG. 8 is a graph showing the output of transducer B of a three phase stepper motor when the motor is rotating at a constant velocity;

FIG. 9 is a graph showing the output of transducer C of a three phase stepper motor when the motor is rotating at a constant velocity;

DETAILED DESCRIPTION OF THE PREFERRED EMBODIMENT

Figure 1:
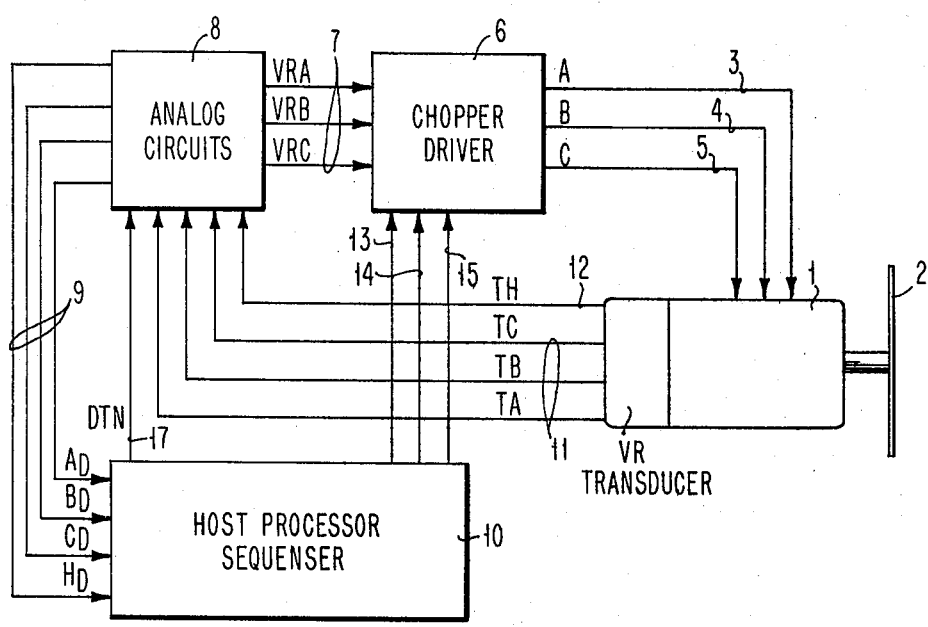
FIG. 1 is an overall block schematic of the motor and its associated control circuitry.

Refer first to FIG. 1. In FIG. 1 is shown a block schematic of the present invention as applied to a three phase stepper motor. The stepper motor 1 receives inputs along lines 3, 4 and 5 from the chopper driver 6. These inputs are labeled A, B and C and correspond to what are designated the A, B and C phases of the three phase motor. The motor operates to drive the load which may, for instance, be a character wheel 2 for an impact printer. The chopper driver 6 also receives inputs VRA, VRB, and VRC along line 7. These inputs are generated by the analog circuits 8. The analog circuits 8 receive the three phase variable reluctance transducer signals along lines 12 from the transducer associated with motor 1. The analog circuits generate VRA, VRB and VRC are current control signals for each of the phases A, B and C respectfully of the motor. The analog circuits 8 also generate the detected transducer signals $A_d$, $B_d$ and $C_d$ along with the AC feedback voltage $H_d$.

The signals $A_d$, $B_d$, $C_d$ and $H_d$ are applied along lines 9 to the host processor and sequencer 10. The particular makeup of the host processor/sequencer is not important to the present invention in that the present invention is not concerned with the overall control of the stepper motor but instead is only concerned with the control during the detenting portion of the travel of the motor. Thus, the host processor/sequencer need only provide an indication of detent, and which of the phases is to be detented for the purpose of the present invention. For the remaining amount of the time the processor in a conventional manner applies the sequencing signals to the chopper driver 6. The selector portion of the processor is merely a conventional selector which applies the appropriate signals to the stepper motor to cause it to be driven.

One such selector available in the prior art for sequencing a stepper motor is shown and described in the aforementioned U.S. Pat. No. 3,399,753. From the host processor selector are shown lines 13, 14, 15, and 17 which apply signals to the chopper driver 6. The commands applied along lines 13, 14 and 15 are the A, B and C phase signals. Along line 17 is applied the signal indicating that the detent mode is operative.

Figure 2:
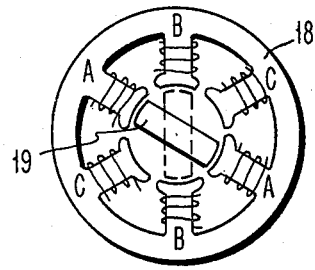
FIG. 2 illustrates the pole and rotor layout of a three phase motor.

Refer next to FIG. 2. In FIG. 2 is shown a typical layout of a stepper motor. The stator 18 includes the A, B and C winding which are in operable association with a rotatable rotor 19. As shown windings A of the stator are energized to cause alignment of the rotor 19 with these windings.

Figure 3:
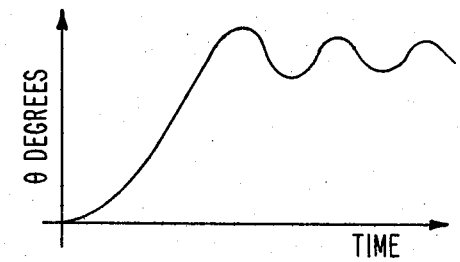
FIG. 3 is a graph illustrating the response of a typical undamped stepper motor.

In FIG. 3 is shown an illustration of the operation of a stepper motor in an undamped system. As shown in FIG. 3 upon application of current to a stepper motor the rotor rotates toward the preselected position and once having reached the preselected position overshoots that position since it arrives at the selected position with a kinetic energy. Since at the selected position there is zero holding torque the rotor tends to overshoot and then begin to oscillate about the desired position and finally settling out.

Figure 4:
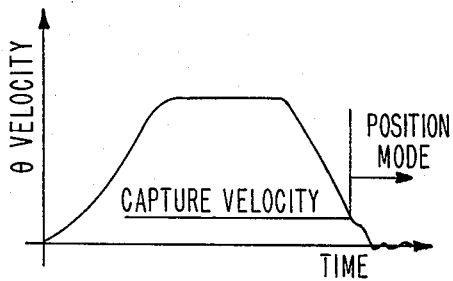
FIG. 4 is a graph illustrating the projectory of a stepper motor from initial move to final positioning.

In FIG. 4 again is shown the typical velocity curve of a stepper motor illustrating that the motor comes up to acceleration, can be held at a fairly steady state and then caused to enter into a deceleration period until a positioning mode or positioning time is reached at which time detenting action takes place. The purpose of the present invention is again to damp out the detent oscillation of a stepper motor.

Figure 5:
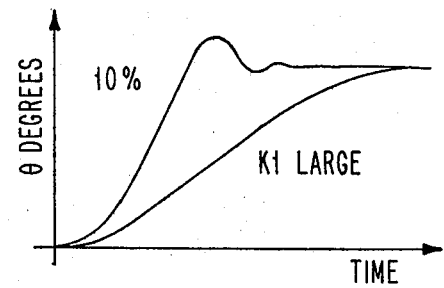
FIG. 5 is a graph illustrating the operation of the present invention to provide a dampened response.

In FIG. 5 is shown a graph of the typical oscillation of a stepper motor as illustrated in FIG. 3 plotted against the response of a stepper motor controlled in accordance with this present invention. As shown in FIG. 5 the operation of the stepper motor tends to level out based on the size of the constant applied to the motor control as will hereinafter be described.

Referring next to FIG. 6 there is shown a motor torque verses displacement graph. As shown the three phases of the motor have their zero crossings separated by 3.75°. In FIGS. 7, 8 and 9 there is shown a graph of the velocity output of the transducers associated with each of the motors in accordance with the transducer mounting of the present invention. Thus, as previously stated, the transducers are mounted on the motor such that their zero crossings correspond to the zero torque crossings of the motor and their maximum velocity output occurs at the maximum torque output of the motor. Referring to FIG. 7 it can be seen that the voltage of the transducer is in phase with the torque output of A windings of the motor; the voltage output of the B transducer is in phase with the torque output of the B windings of the motor; and the voltage output of the C transducer is in phase with the torque output of the C windings of the motor. Still referring to FIGS. 6 through 9, the method of damping used in the present invention requires three 32 cycle per revolution AC feedbacks the outputs of which are proportional to the angular velocity of the motor. These reluctance pick-up feed devices are rotationally phase shifted 3.75° with respect to one another which results in a 120° electrical phase shift and additionally phased to the motor rotor rotationally such that the zero voltage crossings of the transducers correspond to the zero torque crossings of the motor. This is shown in FIGS. 7 through 9 with reference to FIG. 6. The feedbacks provide velocity information for each motor phase such that the current in each phase can be controlled when the motor is being detented.

For purposes of illustration, first consider a typical undamped, one position move from detent position C to detent position A. Prior to the start of the move the current in winding C would be at a fixed DC value and the currents in windings A and B would be zero. As the current in winding C decreases toward zero and the current in winding A increases toward a fixed DC value, the resulting torque unbalance causes the rotor to accelerate to detent position A arriving at the zero torque crossing with some value of kinetic energy. The rotor will oscillate about the detent position until the energy has dissipated, which typically requires several cycles due to low dampening characteristics as illustrated in FIG. 3.

In the hereinafter detailed example, the control system will use all phases of the motor to achieve large damping rates. In the particular example A is the detented or selected phase. The following control equation will be implemented.

$I_a$ = DC value + A feedback *K1

$I_b$ = B feedback *K1

$I_c$ = C feedback *K1 where $I_a$, $I_b$, and $I_c$ represent current in the respective windings and the K1 represents a selectable gain constant.

Therefore at the beginning of a one step sequence the current in winding A increases, the current in winding C decreases and the rotor begins to move toward detent A as in the undamped case. However, as this occurs the phase currents are modified by the velocity feedback in the following manner: phase current A will be decreased since the A feedback is in the negative region; phase current C will be increased by C feedback; and phase current B will be increased until sufficient motion occurs to produce negative feedback.

The summation effect of the three phases is to control the torque in relation to velocity. The response characteristics are controlled by the gain of the feedback loops K1. Low values of K1 produce rapid response with large overshoot and conversely, large values of K1 produce overdamp responses.

Referring again to the single step move and inspecting the overshoot characteristics it can be seen that as the rotor passes the detent position the A feedback changes polarity causing the current in winding A to be increased beyong the DC value producing maximum deceleration torque for that phase location. The feedback will remain positive until the rotor reaches the maximum overshoot position, then as the rotor reverses direction the moves toward the detent the polarity of A feedback changes and the current in winding A is reduced. The other feedbacks also change polarity and the conditions are similar to the beginning single step sequence where phases B and C are essentially reversed. For multi-step moves the velocity feedbacks are not used until the rotor is within one and one-half steps of the detent position. The major effect of this control is the system that has low damping characteristics without velocity feedback resulting in fast response for multi-step moves and additionally, high damping rates for the position mode by closing the velocity feedback loops.

Figure 10:
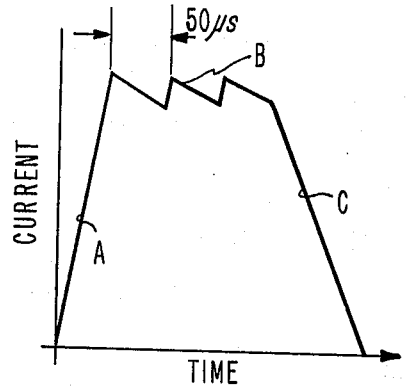
FIG. 10 is a graph illustrating the current applied to a selected winding which is the detent winding of a three phase stepper motor in accordance with the present invention.

Refer next to FIG. 10 wherein current is plotted against time. For the selected phase as shown in the portion of the curve labeled A current is initially applied to the winding and increases very rapidly in the winding. During the portion labeled B current is maintained in the winding and during the portion C once the approximate detent position has been reached the current is removed rapidly from the winding. This is to assure good capture and detenting.

Figure 11:
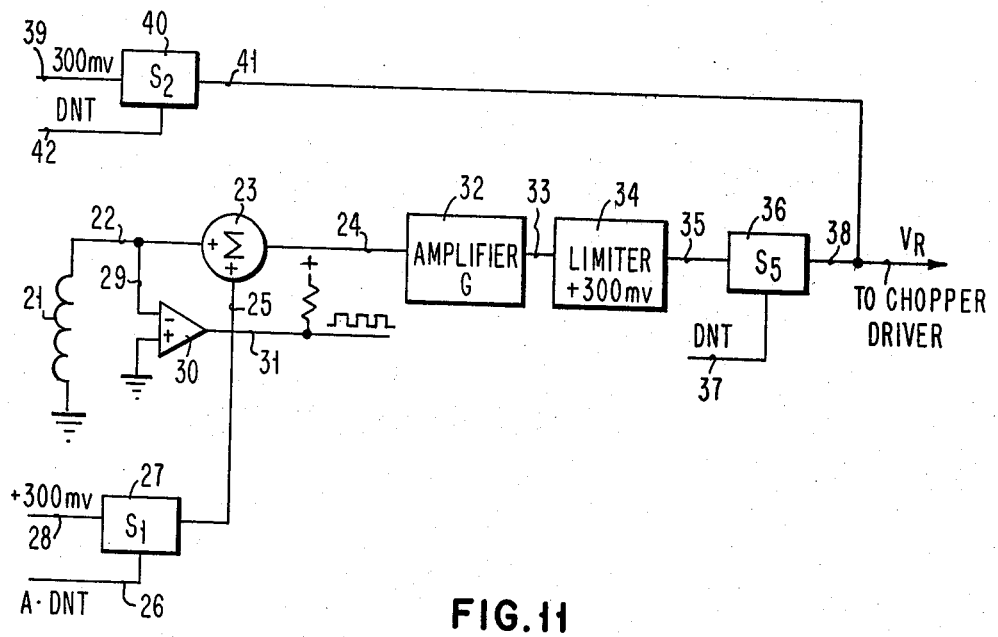
FIG. 11 is a schematic diagram of the analog circuitry required to drive the drivers of FIG. 13 to accomplish control of the stepper motor in accordance with the present invention.

Refer next to FIG. 11. In FIG. 11 is shown a portion of the analog input circuit for developing a reference voltage for driving the current driver/chopper circuit of FIG. 12. The circuit of FIG. 11 functions to provide a voltage for controlling the current applied to each of the windings in the stepper motor during normal running; current to the selected detent winding; and current to the non-detent windings during detenting or capture of the particular winding. The output from transducer 21 is applied to summer 23 and along line 24 to amplifer 32. Summer 23 also receives an input along line 25 from FET gate 27. For a 3 amp current with a 0.1 ohm sense resistor +300 millivolt voltage is applied along line 28 to gate 27. Gate 27 is turned on by application of a positive potential to line 26. For purposes of illustration, it is assumed that this particular analog circuit is associated with the A winding of the stepper motor. Obviously each of the windings will have a circuit corresponding to FIGS. 12 and 13. The gate 27 will be turned on when the logic of the system has indicated that the A winding is the detent winding.

Transducer 21 is also connected along line 29 to comparator 30 which applies its output along line 31. The function of comparator 30 is to provide a shaped output to the host processor as previously discussed. The output of summer 23 is applied along line 24 to amplifier 32 which has its output applied along line 33 to the limiter 34. The output of limiter 34 which functions to limit the output from the amplifier to +300 millivolts is applied along line 35 to FET gate 36. FET gate 36 is turned on by application of a positive potential to line 37 which as indicated in this case is the logical condition of detent. The output of AND gate 36 is applied to line 38 which is the voltage reference output. Also connected to the output line 38 is a FET device 40 which is operative to apply the positive 300 millivolt signal on line 39 to line 41 whenever a positive potential is applied to line 42. The logical condition for line 42 is when the system is not, as indicated, in a detent mode.

In operation assume first that the stepper motor is to operate in a normal non-detent or non-capture mode. In this case the +300 millivolt potential appearing on line 39 is to be applied to the output line $V_R$ for use by the current chopper of FIG. 13 the operation of which will be later described. Application of the positive logical condition indicating that the system is operating in the non-detent mode is applied to line 42 which gates the +300 millivolt signal onto line 41 causing it to appear on line 38 and, thus, represents the $V_R$ output.

Assume next that the A phase is the detent phase. In this event the signal on line 26 which is the A detent signal is at a positive logical level causing the potential on line 28 which is +300 millivolts to be gated through device 27 and applied to line 25 which is one input to the summer 23. This +300 millivolt signal is summed with the output from transducer 21 which is applied along line 22 to summer 23. The two signals are summed and the resultant signal is applied along line 24 to amplifier 32 having a selected gain of G. The output of amplifier 33 is applied to limiter 34 which limits the maximum excursion of the summed and amplified signals to +300 millivolts. The output of limiter 34 is applied to line 35 and appears as an input to gate 36. Gate 36 will have a positive logical signal applied to line 37 since the detent mode is selected, and thus, the signal on line 35 will constitute the $V_R$ input to the current chopper of FIG. 12. Thus, the summed signal from the transducer and steady state signal in the case that the A winding is selected will be the $V_R$ signal applied to the current driver of winding A.

Next assume that winding A is not the detent winding. In this case the positive gating potential would not be applied to line 26 and thus, the sole input to summer 23 would be from transducer 21. Again, the circuit then operates as normal such that for the non-selected windings during the detect mode $V_R$ is equal to the output from transducer 21 passed through amplifier 32 and limiter 34.

Figure 12:
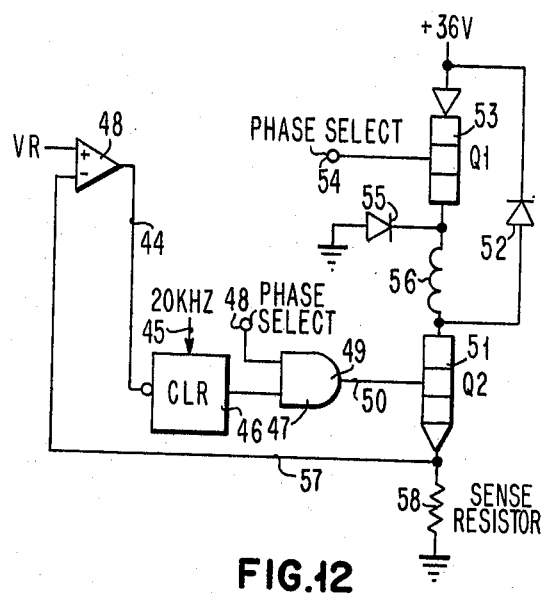
FIG. 12 is a schematic diagram of a current driver/chopper for a three phase stepper motor winding.

Refer next to FIG. 12 which is a schematic of the chopper/current driver for each of the windings. As previously discussed there will be one chopper current driver for each of the three phases. The $V_R$ signal from FIG. 12 is applied to one input of comparator 48. The output of comparator 48 is applied along line 44 to the bistable device 46 which also receives an input along line 45 from the 20 kilohertz clock. The output of device 46 is along line 47 to AND gate 49. AND gate 49 also receives an input along 48. Line 48 will have a positive logical level applied to it when the phase is selected. The output of gate 49 is applied along line 50 to transistor 51. Transistor 51 is connected to one side of motor winding 56, to diode 52 and the positive 36 volt potential. The positive 36 volt potential is also connected to the emitter of transistor 53 which has its base connected along line 54 to the phase select logical signal. This signal on line 54 will be positive again when the particular phase is selected. The collector of transistor 53 is connected through diode 55 to ground and is connected to the opposite side of motor winding 56. The emitter of transistor 51 is connected through sense resistor 58 to ground and is connected along line 57 to the other input of comparator 48.

For an operational description assume first that the stepper motor is being operated in a non-detent mode. In this case, as previously described, this signal $V_R$ which is input into comparator 48 is a +300 millivolt steady state signal. The comparator 48 upon application of this signal applies, assuming that its other input is relatively low, a positive logical level on line 48 which is applied to be bistable device 46. The bistable device 46 applies a positive logical level to line 47 which is one input to AND gate 49. The other input to AND gate 49 is from line 48. Line 48 will have a positive logical level on it since the winding has been selected. A positive logical level will in turn appear on the output of AND gate 49 and on line 50. This positive logical level will turn transistor 51 on. Likewise, a positive logical level will be applied along line 54 to turn transistor 53 on. Turning on of these two transistors causes the current to flow through transistor 53 through winding 56 through transistor 51 and sense resistor 58 to ground. The initial buildup in current in winding 56 corresponds to the A portion of the curve of FIG. 11. Once the current buildup through winding 56 has been completed a +300 millivolt potential is at the emitter of transistor 57. This potential is applied as an input to comparator 48. When this occurs comparator 48 will provide a negative logical level along line 44 to bistable device 46. This will shut off device 46 for a short period of time depending upon the clock time which is applied along line 45. During this shut off time the negative potential applied along line 47 causes a negative potential to be applied along line 50 thus turning the transistor 51 off. During this time the current flow from the +36 volt power supply is through transistor 53, the winding 56 and diode 52. The current through this loop will decay based on the voltage drop across the saturated device 53 and diode 52. This decay is shown in the semisaw tooth wave form of FIG. 10. After a predetermined time the clock pulse on line 45 will cause device 46 to turn on temporarily causing a positive potential to be applied to the base of transistor 51 to cause maximum current to again flow through winding 56 to transistor 51 and sense resistor 58. This sequence continues until the particular phase is deselected. This results in application of a negative potential to lines 58 and 48 which effectively turns off transistors 53 and 51 respectfully. When this occurs the current path is from ground through diode 55 through winding 56, diode 52 and through the power supply thus providing a relatively rapid decay of current in the winding 56 as illustrated in the C portion of FIG. 10. The operation of FIG. 12 is essentially the same when the system is operating in the detent mode. Thus, as previously described, when a winding is a non-detent winding the transducer output is applied as the $V_R$ voltage and, as previously discussed, is limited to +300 millivolts. In this case the wave form is an alternating wave form and will result in the application of an alternating wave form to winding 56 which is proportional to the velocity of the rotor. Again, when the system is in the detent or capture mode and the particular winding is the detent winding the system will apply a $V_R$ voltage to the current/chopper of FIG. 13 which is a summation of the +300 millivolts from device 27 and the transducer voltage summed in summer 23.

Thus, as described, the circuit of FIG. 12 is driven by a steady state 300 millivolt potential when the system is not in a detent mode. All three current/choppers of the three phases are driven by this positive +300 millivolt potential to apply rotational torque to the rotor. When in a detent mode the two non-detent windings have transducer voltage applied to their respective current/choppers. Again this transducer potential is in proportion to the velocity of the system. Finally, the phase which is the detent phase will not only have its transducer voltage which is, again, proportional to velocity applied to it, but will have summed with it a +300 millivolt signal in summer 23 to provide the resultant $V_R$ signal. In this manner the damping currents during the damping or capture mode are applied to both the detent phase and the two non-detent phases. With respect to the non-detent phases the current is proportional to the rotational velocity of the motor as determined by the feedback transducer alone. The detent winding not only has an input proportional to the motor velocity as provided by the transducer, but in addition, has a +300 millivolt signal summed with the +300 millivolt signal summed with it. The net result is that the system operates as previously described to rapidly accomplish detenting about the desired detent position with the overshoot determined by the gain of the system. Again, the gain can be selected such that quite rapid damping occurs depending upon the desired system response. The system is further operative to provide the damping of the oscillation about the zero torque position at the detented position in that the current in the windings changes as the detent position is passed in one direction to pull it back toward the detent position very rapidly and thus provides very rapid capture and detenting.

In summary, a damping control system for a three phase stepper motor is provided. A reluctance velocity transducer is used for each of the three phases. The output of each of the transducers is proportional to the rotational velocity of the motor. Each of the transducers is rotationally phase shifted 3.75 with respect to one another and phased to the motor rotor rotationally such that the zero voltage crossings of the transducers correspond to the zero torque crossings of the motor. During damping or detenting of the motor the detent phase has current applied to it which is equal to a predetermined fixed value plus feedback from its associated transducer. The windings on each side of the detent position have current applied to them which is proportional to the voltage from their respective feedback transducers. The voltage in each of the windings is amplified by a selected gain constant. The current in each of the windings is such that maximum torque is applied to drive the motor to the detent position with appropriate current reversals in the windings to damp out any kinetic energy in the rotor during detenting.

While the invention has been particularly shown and described with reference to a particular embodiment, it will be understood by those skilled in the art that various changes in form and detail may be made without departing from the spirit and scope of the invention.

What is claimed is:

1. A method of controlling a multi phase stepper motor having a set of windings for each of its phases to provide damping and detenting of the rotor of said motor under control of a damping signal at a selected final position in alignment with one of said sets of windings selected as the detent position, said method comprising:
   developing an analog feedback signal which is related to the angular velocity and position of said rotor during said damping mode,
   applying a unique current to each of said phase windings which is related to said analog signal in a direction to produce retardation of said rotor rotation as said rotor approaches said detent position, and
   applying an additional current to the phase windings of said detent phase.

2. A motor control method of claim 1 further including the step of controlling the magnitude of unique current in the winding associated with said detent position by reversing the direction of said feedback signal after said rotor has passed said detent position.

3. The motor control method of claim 2 further including the step of developing said analog feedback signal for each of said phases and causing each of said feedback signals to timewise track the torque produced by its associated phase.

4. The motor control method of claim 3 further including the step of amplifying said unique current applied to each of said windings by a constant.

5. The method of claim 3 further including the step of time wise tracking causing the zero crossings of said unique current to correspond to the zero torque crossings of said motor.

6. The method of claim 5 further wherein the current of each of said windings is described by the following equations:

$$I_a = \text{DC value} + A \text{ feedback} * K1$$

$$I_b = B \text{ feedback} * K1$$

$$I_c = C \text{ feedback} * K1$$

where $I_a$, $I_b$, and $I_c$ represent current in the respective windings which is constrained to be positive and K1 represents a gain constant with phase A the detented phase.

7. A three phase stepper motor control circuit for controlling the current applied to each of the three sets of phase windings of said motor to detent the rotor of said motor at a detent position in alignment with one of the sets of phase windings under control of a detent signal, the control circuit comprising:
   means for developing an analog signal related to the angular velocity and position of said motor during damping,
   means for developing a unique current related to said analog signal for each of said sets of phase windings,
   means for applying said currents to its associated set of windings during damping, and
   means for applying an additional current to the one of said sets of windings corresponding to said detent position.

8. The motor control circuit of claim 7 further including means for causing the analog related current in said windings to be of a direction to produce retardation of said rotor rotation of said rotor as it approaches said detent position.

9. The motor control circuit of claim 8 further including means for controlling the magnitude of said analog related current in the winding associated with said detent position by reversing the direction of the transducer feedback voltage after said rotor has passed said detent position.

10. The motor control circuit of claim 9 further including means for developing a feedback signal for each of said phases and causing each of said feedback signals to timewise track the torque produced by its associated phase.

11. The motor control circuit of claim 10 further including means for amplifying the said analog related current applied to each of said windings by a constant.

12. The motor control circuit of claim 11 further including means for controlling said analog related current to cause it to have zero crossings corresponding to the zero torque crossings of said motor.

13. The motor control circuit of claim 12 further including means for causing the current in each of said windings to be as described by the following equations:

$$I_a = \text{DC value} + \text{A feedback} * K1$$

$$I_b = \text{B feedback} * K1$$

$$I_c = \text{C feedback} * K1$$

where $I_a$, $I_b$, and $I_c$ represent current in the respective windings which is constrained to be positive and K1 represents a gain constant with phase A the detented phase.

* * * * *

UNITED STATES PATENT AND TRADEMARK OFFICE
CERTIFICATE OF CORRECTION

PATENT NO. : 4,286,202
DATED : August 25, 1981
INVENTOR(S) : Douglas E. Clancy, Richard F. Frankeny, George P. Olson It is certified that error appears in the above-identified patent and that said Letters Patent are hereby corrected as shown below:

Column 1, line 34, delete "electrochemical" and insert --electromechanical--;
Column 2, line 1, delete "load";
Column 4, line 42, delete "winding" and insert --windings--.

Signed and Sealed this

Tenth Day of November 1981

[SEAL]

Attest:

GERALD J. MOSSINGHOFF

Attesting Officer

Commissioner of Patents and Trademarks